United States Patent [19]

Scheifele et al.

[11] Patent Number: 5,505,813

[45] Date of Patent: Apr. 9, 1996

[54] APPARATUS AND PROCESS FOR THE PRODUCTION OF TUBULAR BODIES

[75] Inventors: Freddy Scheifele, Hinwil; Hans Burger, Pfaffikon, both of Switzerland

[73] Assignee: KMK Lizence Ltd., France

[21] Appl. No.: 73,590

[22] Filed: Jun. 8, 1993

Related U.S. Application Data

[63] Continuation of Ser. No. 556,564, Jul. 20, 1990, abandoned.

[30] Foreign Application Priority Data

Jul. 21, 1989 [CH] Switzerland ............... 2721/89
Jul. 21, 1989 [CH] Switzerland ............... 2722/89
Jul. 21, 1989 [CH] Switzerland ............... 2723/89

[51] Int. Cl.[6] .................... B30B 5/04; B30B 15/34
[52] U.S. Cl. ............. 156/380.1; 156/438; 156/466; 156/498; 156/583.5
[58] Field of Search .................... 156/203, 218, 156/275.1, 308.4, 311, 312, 380.1, 438, 466, 455, 498, 494, 583.5

[56] References Cited

U.S. PATENT DOCUMENTS

| | | |
|---|---|---|
| 3,388,017 | 6/1968 | Grimsley et al. |
| 3,547,742 | 12/1970 | Cottrell .................... 156/312 |
| 3,575,769 | 4/1971 | Radzio . |
| 3,739,129 | 6/1973 | Miller .................... 156/203 |
| 4,080,241 | 3/1978 | Grevich et al. |
| 4,362,593 | 12/1982 | Grevich . |
| 5,310,443 | 5/1994 | Burger .................... 156/466 |

FOREIGN PATENT DOCUMENTS 0589298 5/1988 Australia .
1045889 10/1966 United Kingdom .

Primary Examiner—Michael W. Ball
Assistant Examiner—Richard Crispino
Attorney, Agent, or Firm—Bachman & LaPointe

[57] ABSTRACT

An apparatus for the production of tubular bodies, in particular for packaging tubes, from a foil strip (48) which comprises weldable plastic material and the longitudinal edges of which are thermally joined together has a shaping belt (46) which co-operates with shaping rollers (59, 60) and which shapes the foil strip (48) around a mandrel (45) to provide a tubular body, a lower driven transportation belt (20) which runs in the mandrel (45) and an upper driven transportation belt (33), the longitudinal edges of the foil strip (48) being accommodated in mutually overlapping relationship between the transportation belts. The upper transportation belt (20) is in the form of an endless belt which passes beneath a heating means, a pressing means and a cooling means and the heating means is in the form of an inductively operative high frequency heating means. In a process which can be carried out with that apparatus, the foil strip (48) is formed into a tube with an overlap formed from the edges of the foil, for the purposes of forming a welded seam in its longitudinal direction, and the overlap is introduced with its outer and inner sides of the tube into a belt gap (70) which is formed from the two transportation belts (20, 33) which are driven and circulate endlessly in parallel relationship, is melted therein by the transportation belts (20, 33) at least until phases which are capable of flow are formed, is pressed with preliminary hardening of the phases which are capable of flow, and is then cooled under the application of pressure.

18 Claims, 2 Drawing Sheets

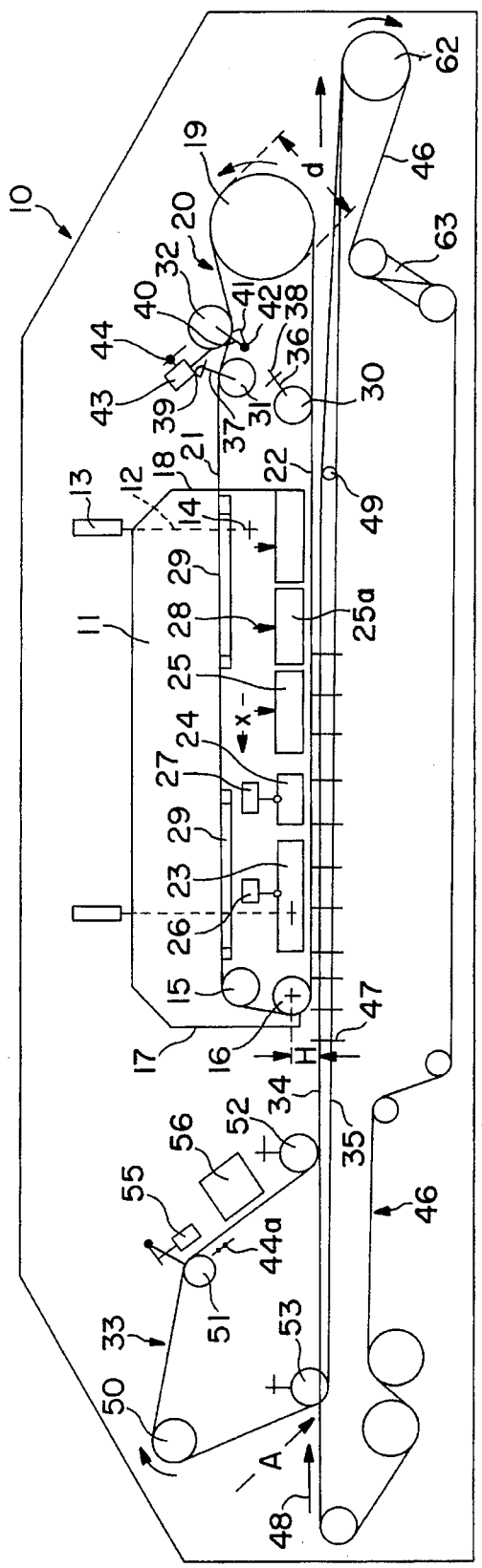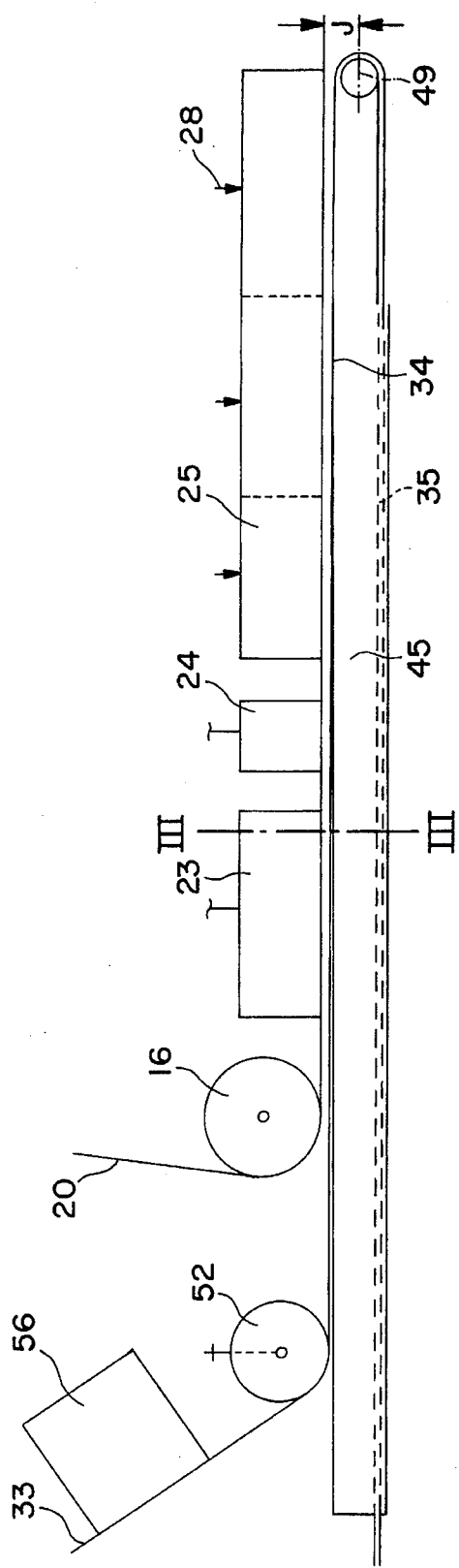

APPARATUS AND PROCESS FOR THE PRODUCTION OF TUBULAR BODIES

This is a Continuation of application Ser. No. 556,564, filed Jul. 20, 1990, now abandoned.

BACKGROUND OF THE INVENTION

The invention relates to an apparatus and a process for the production of tubular bodies, in particular for packaging tubes, from a foil strip comprising weldable plastic material, the longitudinal edges of which are thermally joined together.

U.S. Pat. No. 3,388,017 discloses an apparatus for the production of tubular bodies from a thermoplastic strip material, wherein the strip material is supported from below by a driven conveyor belt which is of smaller width than the strip material, and is introduced jointly with same into a divided, upwardly open shaping sleeve.

The arrangement also has two driven transportation belts of which one is guided in grooves in a mandrel and the other is arranged in such a way that the overlap location of the tubular strip is guided by the two transportation belts, in clamped relationship and subjected to pressure, during the passage of the strip through the shaping body formed from the shaping sleeve.

The transfer of heat in the seam welding operation is effected by contact heat which is applied to the foil and removed therefrom by heating bodies and downstream-disposed cooling bodies, by way of a transportation belt. It has been found that that known apparatus suffers from the disadvantage that uncontrollable frictional forces occur in the shaping body, and those forces frequently result in relative movements between the transportation belts and a seam which has already been softened, thus resulting in unusable tubular bodies, due to the poor appearance of the seam.

In accordance with the known construction, a transportation belt co-operates both with the welding zone and also with the cooling zone. As the transportation belt contains different amounts of heat, corresponding to the respective zones, in the event of relative movements the quality of welded seams is adversely affected to a clearer extent than if a first transportation belt were to cooperate only with the welding zone, and a second transportation belt were to co-operate with the cooling zone. Moreover a one-piece upper transportation belt is subjected to a higher thermal loading than a two-piece belt, and that is considered to be a disadvantage in regard to synchronous movement as between the upper and lower transportation belts.

The other deficiencies from which the construction disclosed in U.S. Pat. No. 3,388,017, in conjunction with technical limitations which, in the view of the men skilled in the art, result from the one-piece upper transportation belts, have resulted in two directions of development in regard to apparatuses for the purpose with which we are concerned here.

Swiss patent specification No. 614 660 discloses an installation for the production of shapable tubular bodies from thermoplastic foil strip, wherein the foil strip may be a metal-plastic composite foil comprising at least three layers, which is referred to as a monofoil. Similarly to the construction disclosed in U.S. Pat. No. 3,388,017, the tubular body is formed in a stationary shaping arrangement comprising a shaping sleeve with an intake funnel portion and a mandrel which extends through the shaping sleeve and the intake funnel portion, in a condition of rubbing engagement of the foil strip with the components of the shaping arrangement. The tube which is formed in the shaping arrangement is moved in the axial direction of the mandrel by means of an upper driven transportation belt and a lower transportation belt which runs freely in the mandrel. The upper driven transportation belt co-operates with a heating and pressing means which heat and press the overlapping edges of the foil while cooling is effected directly, that is to say without using a cooling belt.

In the case of production of tubular bodies from composite foils, the heating effect is preferably to be produced by high-frequency heating, while in relation to monofoils, heating is preferably effected by ultrasound.

As a shaping arrangement is provided, frictional forces occur in the same way as in the shaping apparatus disclosed in U.S. Pat. No. 3,388,017, and those frictional forces result in relative movements between the seam and the transportation belt, with the known disadvantages. By virtue of its relatively uniform heat content, the one-piece upper transportation belt which only co-operates with the heating and pressing means somewhat alleviates the disadvantages of the apparatus disclosed in U.S. Pat. No. 3,388,017, but it does not completely eliminate them.

An apparatus for the production of tubular bodies, which represents another direction of development, is known from European patent application No. 0 264 663. The apparatus is supplied with a foil strip which includes an aluminum layer embedded into at least two plastic layers. In the apparatus the foil strip is rolled around a mandrel to form a tube with overlapping ends by means of a shaping belt co-operating with guide elements. The stationary shaping devices which are known from the described state of the art are replaced in this system by a moving shaping belt on which the foil lies during the shaping operation, free from any movement between the shaping belt and the foil, and thus in a friction-free condition.

The overlapping ends pass between a lower driven transportation belt which runs on the mandrel and two upper driven transportation belts which are arranged one after the other, wherein the welding operation is effected by heat and pressure by means of the first transportation belt and cooling of the welded seam is effected by the second downstream-disposed transportation belt.

Heating of the plastic layers, which is required to produce the welding effect, is effected by the metal layer being inductively heated by high frequency during the operation in which the edges are pressed together, so that the welding heat is produced directly in the foil. Due to the use of a two-piece upper transportation belt, the welded seam can also be shaped during the cooling operation under the action of external forces, without the higher level of thermal loading with the known effects thereof in regard to synchronous movement having to be tolerated, as in the case of a one-piece transportation belt which passes beneath the welding and cooling means.

It has been found that that design configuration suffers from the disadvantage that it cannot be used to weld monofoils with the required level of quality; the term monofoils also includes multi-layer plastic foils in which for example a gas-tight plastic ply or layer is embedded between two non-gas-tight plies or layers, for example of polyethylene. The required level of quality is not achieved by heating of the transportation belts by inductive heating means with heat then being given off to the monofoil, or by the use of ultrasound for foil heating purposes.

SUMMARY OF THE INVENTION

Taking that state of the art as his starting point, the inventor set himself the object, avoiding the disadvantages from which the known apparatuses suffer, of providing an apparatus for the production of compressible tubular bodies from monofoils, which operates with inductively acting high-frequency means for the production of welded seams.

In accordance with the invention that object is achieved. The present invention comprises an apparatus for the production of tubular bodies, in particular for packaging tubes, from a foil strip comprising weldable plastic material and whose longitudinal edges are thermally joined together, comprising a shaping belt which co-operates with shaping rollers and which shapes the foil strip around a mandrel into the form of a tubular body, a lower driven transportation belt which runs in the mandrel and an upper driven transportation belt, the longitudinal edges of the foil strip being accommodated in mutually overlapping relationship between the transportation belts, and at least one heating means, pressing means and cooling means acting on an upper transportation belt.

In contrast to the known apparatuses for welding composite foils by means of high frequency, in which the melting heat occurs predominantly in the composite foil itself, the apparatus according to the invention provides that the transportation belts are heated by means of high frequency, and in turn give off the heat to the plastic foil to produce melting of the plastic material. With that design configuration it has surprisingly been found that it is possible to weld monofoils in that way, with the welded seams being of very high quality. Another surprising aspect was that the thermal loading of the transportation belt which is undivided according to the invention and which passes beneath the heating means, pressing means and cooling means, is distinctly lower than in the case of a divided transportation belt which is used with the sane operating parameters for the welding of composite foils. Accordingly, there was no need for means other than the means proposed in accordance with the invention, for insuring synchronous movement of the two transportation belts and the shaping belt member.

Also within the scope of the invention is an apparatus which attains the object of further improving an apparatus as known from European patent application No. 0 264 663, and improving it for the use according to the invention, in such a way that, using a one-piece upper transportation belt, monofoils can be processed to provide tubular bodies with welded seams of uniformly good quality.

Tubular bodies of monofoils with welded seams of very high quality can be produced at a high forward feed speed with the configuration according to the invention of the known apparatus.

The process which is also embraced by this invention for the production of tubular bodies from monofoil seeks to make it possible to produce tubular bodies with uniform welded seam quality and production speed. For that purpose the foil strip (monofoil strip) is shaped into a tube with an overlap formed from the edges of the foil, for the formation of a welded seam, in the longitudinal direction of the foil strip, and the overlap is introduced with its outer and inner sides of the tube into a belt gap formed from two driven transportation belts which endlessly circulate in parallel relationship with each other, therein the foil strip is melted at least until phases which are capable of flow are formed, pressed with preliminary hardening of the phases which are capable of flow, and then cooled under pressure.

The process of the present invention now makes it possible to produce tubular bodies from monofoils with the same production security and production rate as in the production of tubular bodies from composite foils.

BRIEF DESCRIPTION OF THE DRAWINGS

Further advantages, features and details of the invention will be apparent from the following description of a preferred embodiment and with reference to the drawings in which:

FIG. 1 is a diagrammatic side view of an apparatus for the production of tubular bodies for packaging tubes;

FIG. 2 shows a portion from FIG. 1 on a larger scale than FIG. 1;

DETAILED DESCRIPTION

Figure 3:
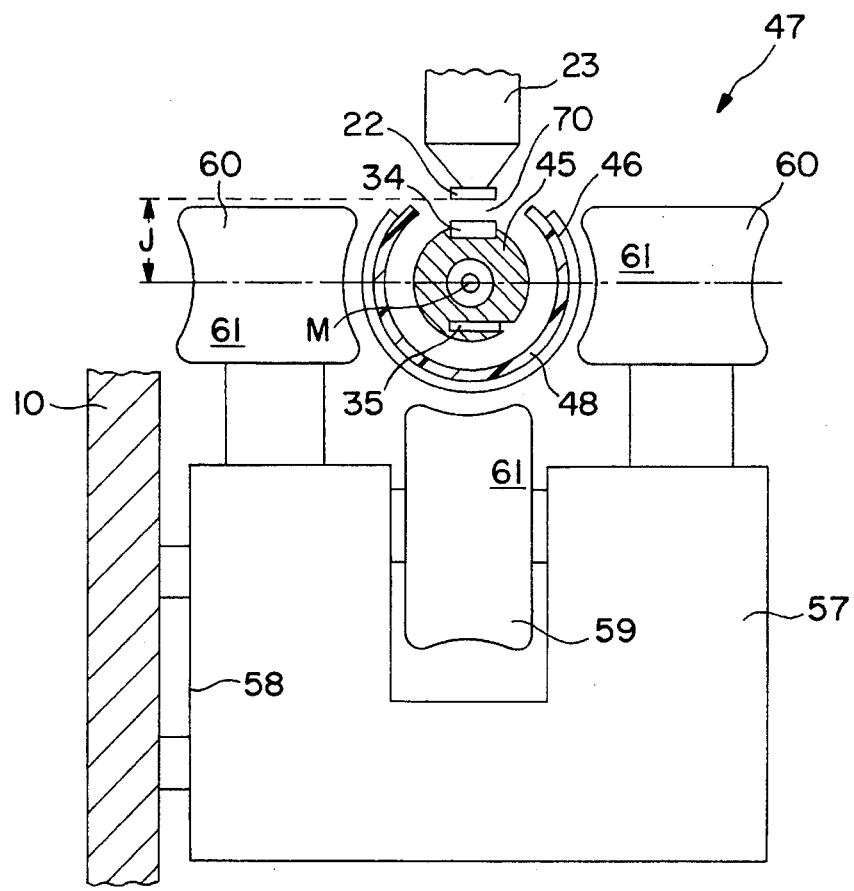
FIG. 3 shows a view in section through a shaping element approximately along line III—III in FIG. 2.

The apparatus according to the invention, as shown in FIG. 1, for the production of tubular bodies, comprises a base plate 10 to which a carrier plate 11 is mounted for movement in a vertical direction. The movable mounting is effected by way of control members 12 which are disposed between the base plate 10 and the carrier plate 11. The carrier plate 11 can be positioned and fixed vertically in position by means of the control members 12.

The diagrammatically illustrated control members 12 are preferably pneumatically activatable control members, the upper ends 13 of which, being provided by a piston housing, are each secured to the base plate 10, while the lower ends 14, being in each case the free end of the respective piston rod, are engaged with the carrier plate 11.

At the lower end of its front or upstream edge 17 the carrier plate 11 carries a freely rotatably mounted roller 16 and at a spacing thereabove a roller 15 of the same configuration; the positions of the axes of the rollers 15 and 16 are invariable.

Arranged on the base plate 10 at a spacing relative to the rear or downstream edge 18 of the carrier plate 11 is a drive roller 19, the diameter d of which corresponds to the sum of the spacing between the axes of the rollers 15 and 16 and half the diameter of the rollers 15 and 16.

Passing around the drive roller 19 and the rollers 15 and 16 is an endless metal transportation belt 20 with an upper run 21 and a lower run 22 which extend parallel to each other by virtue of the diameter d of the drive roller 19 and the dimensioning and positioning of the upper roller 15 and the lower roller 16.

The spacings of the upper roller 15 and the lower roller 16 from the carrier plate 11 and the spacing of the drive roller 19 from the base plate 10, are of such sizes that the transportation belt 20 moves at a uniform spacing from and in front of the surface of the carrier plate 11, in which respect the expression front surface is used to identify the surface of the carrier plate 11 which is in opposite relationship to the surface of the carrier plate 11, which carries the pivotal connections for the lower free ends 14 of the control members 12.

A heating means 23, a pressing means 24 and a cooling means 25 are arranged movably in a vertical direction in succession on the carrier plate 11, downstream of the lower roller 16 in the direction of movement of the transportation belt 20, between the upper run 21 and the lower run 22 and co-operating with the inward sides thereof, and are of bar-like form.

For the purposes of vertical displacement, the heating means 23 is connected to a control member 26, for example in the form of a pneumatic cylinder unit with piston rod. The pneumatic cylinder unit housing is connected to the carrier plate 11 and the free end of the piston rod is connected to the heating means 23 so that upon suitable actuation of the control member 26, the arrangement can produce a vertically directed raising or lowering movement of the heating means 23.

The heating means 23 preferably includes, extending in the longitudinal direction thereof, an inductively operative high frequency heating system which transmits heat produced in the operative condition to the lower run 22 of the transportation belt 20 and to the upper belt run 34, which is disposed therebeneath, of a further metal transportation belt 33. For uniform warming or heating of the lower run 22 and the upper belt run 34, it is essential that the heating means 23 is not only adjustable vertically for adjusting for example its contact pressure against the inward side of the lower run 22, but also in the direction of movement thereof, for example towards its center line, in aligned relationship or oriented in the same direction, and that can be achieved by varying the longitudinal position of the heating means 23 relative to the carrier plate 11.

Like the heating means 23, the pressing means 24 is mounted displaceably in a vertical direction on the carrier plate 11 by means of a control member 27 in the form for example of a pneumatic cylinder unit with a piston rod, whereby, independently of the contact pressure of the heating means 23, the pressing means 24 can thus apply a variable pressing force against the inside of the lower run 22, in order thereby to influence the flow characteristics of different plastic materials.

The vertical displaceability of the heating means 23 and the pressing means 24 serves overall for three purposes. On the one hand, in that way the apparatus can be adjusted to process foils of different thicknesses. In addition, it is possible to adjust the arrangement to material-specific values, by way of the contact pressure, temperature and pressing pressure. Furthermore vertical displaceability serves to compensate for fluctuations in thickness of the plastic foils. For the latter purpose the apparatus has measuring sensors (not shown) which sense the corresponding values and transmit them for displacement of the control members 26 and 27.

At the lower end of the carrier plate 11 the cooling means 25 is in sliding engagement with the inward side of the lower run 22.

In the illustrated embodiment the cooling means 25 comprises three cooling blocks $25_a$ which are mounted for limited movement in a vertical direction in a common holder on the carrier plate 11.

Provided between the holder and the respective side of each cooling block $25_a$, which is disposed in opposite relationship to the inside of the lower run 22, are compression springs 28 which apply a pressing force towards the inside of the lower run 22 so as to guarantee sound contact in order to provide for the uniform transfer of heat from the lower run 22 to the cooling means 25.

If a rising or falling removal of heat is desired in the cooling means 25 in the direction of movement x of the lower run 22, that can be achieved in respect of each cooling block $25_a$ by the installation of compression springs 28 which produce correspondingly stronger or weaker spring forces.

In order to maintain a uniform heat absorption capability, the cooling blocks $25_a$ of the cooling means 25 are cooled by a heat-absorbing medium, preferably by means of air or a flow of water which is passed through the cooling blocks $25_a$. By adjusting the amount of coolant per unit of time, it is possible to adjust the heat absorption capability or the amount of heat removed, in accordance with requirements specific to the material to be welded.

The pressing means 24 is also cooled in the manner of the cooling means 25 so that the pressing operation for example in respect of a welded seam including preliminary hardening thereof can be effected, prior to passing into the cooling means 25, at a uniform temperature, in the course of operation of the apparatus according to the invention.

Arranged above the heating means 23, the pressing means 24 and the cooling means 25 on the carrier plate 11 is at least one cooling bar 29 which is cooled by means of water and which co-operates with the inward side of the upper run 21 and cools it to such an extent that, after having been guided around the rollers 15 and 16, it passes into the heating means 23 as the lower run 22, at an always uniform temperature.

Disposed between the inward sides of the upper run 21 and the lower run 22 are two freely rotatable adjusting rollers 30 and 31 which act on the runs. Disposed between the adjusting roller 31 and the drive roller 19 is a freely rotatable tensioning roller 32 which acts on the outward side of the upper run 21.

With the position of the axis of the drive roller 19 being non-displaceable, the adjusting rollers 30, 31 and the tensioning roller 32 serve on the one hand for the purpose of providing for adjustment of the parallel run relationship of the upper run 21 on the cooling blocks 29 and the lower run 22 on the heating means 23, the pressing means 24 and the cooling means 25, upon a variation in the vertical spacing H of the roller 16 relative to the position of the upper run 34 of the endless transportation belt 33.

In addition to adjustment of the upper run 21 and the lower run 22, the rollers 19, 31 and 32 serve for adjusting the tension of the transportation belt 20 and keeping it constant. The adjusting rollers 30 and 31 are movably mounted by the base plate 10 at the same spacing as the rollers 15 and 16 by means of roller holders 36 and 37 on the base plate 10. At a free end each roller holder 36 and 37 respectively carries the corresponding adjusting roller 30 and 31 while at its other end it is mounted to a fixed anchorage 38, 39 on the base plate 10. The roller holders 36 and 37 are designed to be displaceable and pivotable relative to the anchorage means 38 and 39 so that the spacing between the latter and the axis of the respective adjusting rollers 30 and 31 can be varied and the latter are movable about the anchorage means at a radially variable spacing.

The tensioning roller 32 is secured to the base plate 10 by means of an elbow lever comprising two legs 40 and 41. The legs 40 and 41 together delimit a fixed aperture angle and are mounted rotatably about a fixed anchorage 42, at the point of intersection of the legs 40 and 41. One leg 40 carries the tensioning roller 32 at its free end while the free end of the leg 41 is connected to a pneumatic or hydraulic control member 43 so that, upon actuation thereof, the tensioning roller 32 is movable about the anchorage means 42 for adjusting the tension of the transportation belt 20. A sensor 44 serves to keep the belt tension constant, the sensor 44 sensing the tension of the belt and/or also the temperature thereof, and initiating suitable movements of the control member 43 for regulation purposes.

The part of the apparatus with which a tubular body is formed, as shown in FIGS. 2 and 3, comprises a mandrel 45, a shaping belt 46 which is driven with a circulatory movement and which carries a plastic foil strip 48 on its side towards the mandrel 45, and a plurality of shaping elements 47 which are arranged at spacings from each other in the longitudinal direction of the mandrel 45 and which lay the shaping belt 46 and the foil strip 48 around the periphery of the mandrel 45 and in so doing cause elastic deformation thereof.

Figure 4:
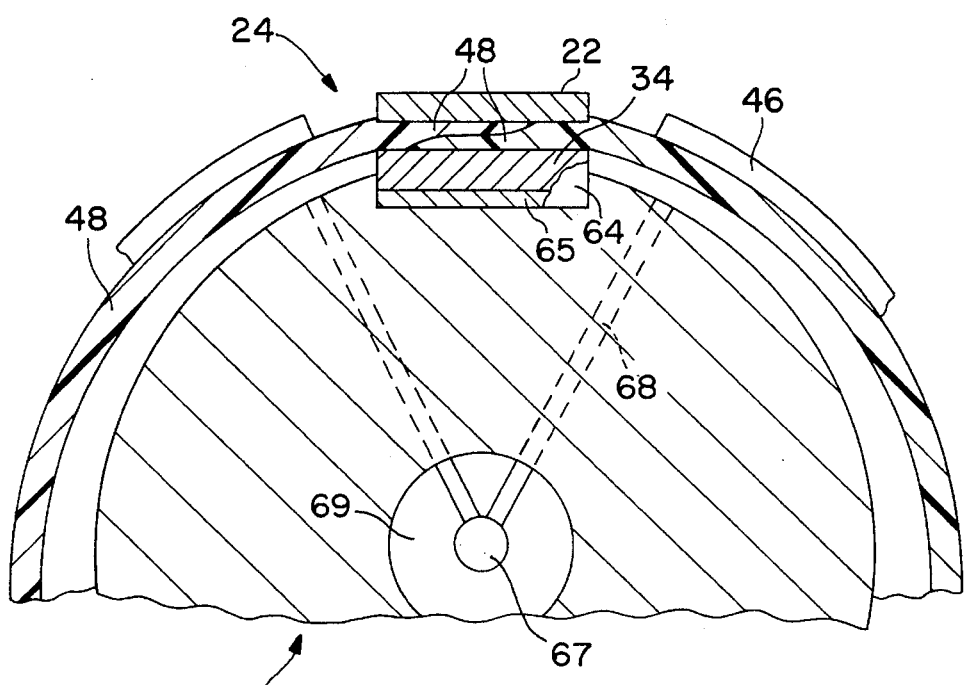
FIG. 4 is a view in section on an enlarged scale through a part of the arrangement for positioning and pressing a plastic foil on a mandrel.

The mandrel 45 which is of round cross-section is fixedly arranged on the base plate 10 and extends in the same direction as and at a spacing from the heating means 23, the pressing means 24 and the cooling means 25 (FIG. 2). Formed in the top side of the mandrel 45 is a longitudinal groove 64 in which the upper run 34 of the metal transportation belt 33 runs. The transportation belt 33 is passed around a direction-changing roller 49 at the front end of the mandrel 45, and is returned in the mandrel 45 as a lower belt run 35. As shown in FIG. 4, the longitudinal groove 64 is provided on its bottom with an insulation 65 to prevent the heat generated in the upper belt run 34 from being carried away. Formed between the belt run 34 and the lower run 22 of the upper metal transportation belt 20 is a gap 70 in which overlapping edges of the foil strip 48, as can be seen from FIG. 4, are firstly melted then pressed together and then cooled, in order to form a longitudinally extending welded seam.

As shown in FIG. 1, the transportation belt 33 passes around a drive roller 50 which is fixedly arranged on the base plate 10, a freely rotatable tensioning roller 51 which is in contact with the inward side of the transportation belt 33, and an adjusting roller 52 which is arranged at the outside thereof and which introduces the upper belt run 34 into the longitudinal groove 64 in the mandrel 45 and, in conjunction with the direction-changing roller 49, insures horizontal synchronous movement in relation to the deepest part of the longitudinal or guide groove 64. That arrangement is then followed, in the direction of movement of the belt, by the direction-changing roller 49, the position of the axis of which is not displaceable, and a further adjusting roller 53.

The tensioning roller 51 and the adjusting rollers 52 and 53 are provided on the base plate 10, like the rollers 30, 31 and 32, while the tensioning roller 51 also keeps the belt tension constant by way of a sensor $44_a$ for detecting temperature and/or belt tension, and a control member 55. In that way, when using different mandrel diameters, it is possible to adjust the spacing J between the longitudinal axis M of the mandrel and the lower run 22, while maintaining a parallel relationship in respect of the lower run 22 in relation to the upper belt run 34 and in respect of the lower belt run 35 in relation to the upper belt run 34.

For the purposes of heating the transportation belt to at least the intake temperature of the lower run 22 into the heating means 23, a resistance heating means 56, preferably in the form of a high frequency coil, is disposed upstream of the adjusting roller 52.

The above-mentioned shaping element 47 which accommodates the mandrel 45, as shown in FIG. 3, comprises a carrier block 57 which is secured by a side 58 to the carrier plate 10. Arranged in the carrier block 57 beneath the mandrel 45 is a shaping roller 59 which rotates about a horizontal axis while two shaping rollers 60 which are each arranged laterally of the mandrel 45 are rotatable about vertical axes, which are adjustable eccentrically for fine adjustment of the magnitude of the foil edge overlap region.

FIG. 1 shows that a plurality of the shaping elements 47, possibly with a common carrier block 57, are connected in succession. Starting from the shaping element 47 which is the first one in the direction of movement of the lower run 22, to the shaping element 47 which positions edges of a foil strip 48 in overlapping relationship on the upper belt run 34 of the transportation belt 33, the spacings of the horizontal and vertical axes of rotation, relative to the center point of the mandrel 45, decrease so that the contact surfaces 61 of a concave configuration, of the shaping rollers 59 and 60 deflect around the mandrel 45 in the longitudinal direction, the shaping belt 46 with the foil strip 48 lying thereon, as they pass between the surfaces 61 of the rollers 59 and 60 and the mandrel 45. The width of the shaping belt 46 is less than that of the foil strip 48 which is supported thereon.

The foil strip 48 is applied to the mandrel 45 only to such an extent that the edges of the foil strip 48 overlap between the lower run 22 of the transportation belt 20 and the upper run 34 of the transportation belt 33, and are held in that position by the edges of the shaping belt 46, but the inside surface of the tube portion formed in that way does not bear against the outside surface of the mandrel 45, in order to avoid frictional forces.

In that way, when dealing with plastic monofoils, enclosed laminates of plastic foil materials of different chemical compositions, the overlap portion which has been caused to melt in the heating means 23 is prevented from being torn away from the adjoining material which has not been caused to melt of the wall of the tube, thereby guaranteeing a uniformly sealed welded seam which is tear-free at its outer edges. As soon as the welded seam attains a predetermined level of mechanical strength and non-deformability by virtue of the removal of heat, the spacings of the axes of the shaping rollers 59 and 60 from the center point of the mandrel 45 increase again so that the shaping belt 46 opens and, with the tube, after release of the tube from the lower run 22 and the upper belt run 34, can move away substantially in a longitudinal direction relative to the mandrel 45.

As shown in FIG. 1, the endless shaping belt 46 which preferably comprises fiber-reinforced plastic which can be easily changed in shape is driven by way of a drive roller 62 and passed over a belt tensioning device 63 and further direction-changing rollers.

The drive roller 62, the belt tensioning device 63 and the direction-changing rollers are arranged on the base plate 10 at spacings such that the center line of the shaping belt 46 coincides with the perpendicular center line of the mandrel 45 so that the edges of the shaping belt, on passing through the shaping elements 47, possibly assisted by eccentric positioning of the shaping rollers 60, are always disposed in opposite relationship in a substantially horizontal plane, thereby ensuring the provision of an overlap region which is of an accurate dimension in terms of its width.

To produce a satisfactory welded seam on tubular bodies of plastic monofoils, it has been found advantageous, in particular for the surface configuration thereof and to prevent molten plastic material from being squeezed out along the inner and outer edges of the overlap region and to avoid stresses and stretching phenomena in and at the edges of the welded seam, for the transportation belts 20 and 33 and the shaping belt 46 to be driven at the same speed of circulation, so that there is no relative movement between the lower run 22 and overlapping edges of the foil strip 48 on the one hand, the overlapping edges of the foil strip 48 and the upper belt run 34 on the other hand, and in addition between the shaping belt 46 and the foil strip 48 which is supported thereon, whereby the overlapping foil edges are melted, pressed, subjected to preliminary hardening and cooled between the moving transportation belts 20 and 33, in a rest condition.

For that purpose the drive rollers 19, 50 and 62 are controlled in such a way as to be matched to each other in respect of their drive speeds, and the belt tensioning device 63 and the tensioning rollers 32 and 51 are activated in their adjustment position in such a way that the transportation belts 20, 33 and the shaping belt 46 are subjected to a uniformly predetermined tension.

The apparatus according to the invention is used to produce a tubular body formed from a single-layer or multi-layer plastic foil without a metal barrier layer, in the following way.

At an entry location A the foil strip 48 passes in a flat condition on to the shaping belt 46 which also moves in a flat condition and, still lying flat, is carried by the shaping belt 46 to the shaping elements 47. The mandrel 45 is disposed above the foil strip 48. In the shaping elements 47 the shaping belt 46 with the foil strip 48 supported thereon is shaped around the mandrel 45 in substantially circular configuration in cross-section of decreasing diameter, by way of the shaping rollers 59 and 60, until the edges of the foil strip 48 have formed an overlap region which is of predetermined size. The width of the shaping belt 46 is such that, after formation of the overlap region, the mutually oppositely disposed edges of the shaping belt 46 do not overlap the overlap region for the subsequent processing operation, but form between them a gap which extends in the longitudinal direction of the tubular portion and in which the overlap region is exposed.

For the purposes of fine adjustment of the magnitude of the overlap region, the shaping rollers 60, by virtue of their eccentric positioning, can be adjusted in such a way that the free edges of the shaping belt 46 displace the edges of the foil strip 48 relative to each other to a greater or lesser extent, thereby producing an overlap region which can be of controllable width. After formation of that overlap region, it lies on the upper belt run 34 which is guided on the surface of the mandrel 46 in a longitudinal groove 64.

Shaping of the foil strip 48 and the shaping belt 46 is effected in such a way that only the overlap region lies on the upper belt run 34, but otherwise, in order to eliminate friction between the stationary mandrel 45 and the foil strip 48 which is being transported, there is no contact between the foil strip 48 and the mandrel 45.

In order to maintain a given operating temperature, the mandrel 45 is provided with a passage 69 which is disposed in the interior thereof and through which flows a cooling medium. Likewise disposed in the interior is an air duct means comprising a bore 67 which extends in the longitudinal direction of the mandrel 45 and from which radial bores 68 extend in the region of the pressing means 24 towards the direction-changing roller 49 to the end of the mandrel 45; the radial bores 68 issue at the periphery of the mandrel 45 and carry air for cooling purposes, to reduce friction and for calibration of the tube diameter, into the space between the surface of the mandrel and the inside wall surface of the tube.

After the formation of the overlap region the latter passes in between the transportation belts 20 and 33.

The lower run 22 of the transportation belt 20 is in contact with its inward side with the heating means 23 which heats the metal transportation belts 20 and 33 by high frequency induction to a temperature which is sufficient to bring the plastic material to a temperature which is required for welding under pressure.

After termination of the heating phase the molten overlap region passes beneath the pressing means 24 which acts on the inward side of the lower run 22, presses the overlap region and at the same time cools it so that it passes in a pre-hardened condition in regard to the configuration thereof, into the adjoining cooling means 25. In the cooling means 25 the amount of residual heat required for mechanical strength of the overlap region is removed therefrom by way of the lower run 22.

After the overlap region has attained a given level of mechanical strength, the shaping belt 46 is opened by virtue of the spacings of the axes of the shaping rollers 59 and 60 relative to the periphery of the mandrel increasing so that the welded tubular portion can run freely off the mandrel 45, for further processing thereof.

For the production of stress-free and tear-free welded seams for tubular bodies of plastic foils it is essential that there are no relative movements during the procedure for forming the welded seam between the surfaces of the overlap region, the belt runs which co-operate with those surfaces, and between the foil strip 48 and the shaping belt 46. For that purpose the metal transportation belts 20 and 33 and the shaping belt 46 are driven at the same speed and are held under a constantly uniform tension in order to prevent thermally-produced stretching effects and therewith individual variations in speed.

We claim:

1. Apparatus for the production of tubular bodies from a foil strip consisting of weldable plastic material and whose longitudinal edges are thermally joined together, comprising a shaping belt which co-operates with shaping rollers and which shapes the foil strip around a mandrel into the form of a tubular body while maintaining a majority portion of said foil strip circumferentially spaced from said mandrel, a one-piece lower driven transportation belt which runs in the mandrel, said lower transportation belt having an upper run and a lower run, and a one-piece endless upper driven transportation belt, said upper transportation belt having an upper run and a lower run and having a longitudinal axis, the longitudinal edges of the foil strip being accommodated in mutually overlapping relationship between the transportation belts, and separate sequential heating means, pressing means and cooling means acting on said upper transportation belt wherein the upper belt passes beneath the heating, pressing and cooling means, a carrier plate movable vertically with respect to the mandrel wherein said heating means, pressing means and cooling means are arranged on said carrier plate, wherein the heating means is of a bar shaped configuration having a longitudinal axis and a longitudinal position and the heating means including means for being adjusted along the longitudinal axis for adjusting the longitudinal position of said heating means relative to the longitudinal axis of the upper transportation belt, said heating means being operative to transmit heat to the lower run of the upper transportation belt and to the upper run of the lower transportation belt for transfer to the longitudinal edges of the foil strip, and wherein the cooling means is engageable with the lower run of the upper transportation belt under a contact pressure, and wherein the pressing means is of a bar shaped configuration and is operative to apply a variable pressing force on the lower run of the upper transportation belt and is displaceable in the vertical direction independent of the heating means relative to the direction of movement of the upper transportation belt, and wherein said pressing means includes means for preliminary hardening the welded seam prior to passing into the cooling means.

2. Apparatus according to claim 1 wherein the heating means is in the form of an inductively operating high-frequency heating means.

3. Apparatus according to claim 1 wherein the heating means is displaceable in a vertical direction with respect to the direction of movement of the upper transportation belt, and wherein vertical displacement is effected by means of activatable control members.

4. Apparatus according to claim 1 wherein the cooling means comprises a plurality of cooling blocks which are arranged in succession in the direction of movement of the upper transportation belt, wherein the cooling blocks are engageable with the upper transportation belt under different degrees of spring prestressing, and wherein the upper transportation belt is engageable with at least one cooling bar arranged downstream of the cooling blocks.

5. Apparatus according to claim 4 wherein the at least one cooling bar is arranged on the carrier plate.

6. Apparatus according to claim 1 wherein the said belts are in engagement with belt tensioning devices which provide for belt tensioning effects and which automatically adjust them to predetermined values.

7. Apparatus according to claim 6 wherein the belt tensioning device of the upper transportation belt comprises a displaceably mounted adjusting roller which is in engagement with the inward side of the upper run of the belt, an elbow lever mounted pivotably about an anchorage, with a tensioning roller which is arranged rotatably at a first free end and which is in engagement with an outward side of the upper run of the transportation belt, and a control member arranged at the second free end of the elbow lever.

8. Apparatus according to claim 7 wherein the elbow lever is connected to an activatable control member for producing pivotal movement of the tensioning roller, including a sensor which detects the tension of the upper transportation belt and which controls the control member.

9. Apparatus according to claim 7 wherein the upper belt run of the lower transportation belt is in engagement at its inwards side with an inward adjusting roller and at its outward side with an outward adjusting roller, the inward adjusting roller being mounted pivotably about an anchorage, including an elbow lever for pivotal movement of the inward adjusting roller movable by means of an activatable control member, including a sensor which detects the tension of the roller transportation belt and controls the elbow lever by way of the control member.

10. Apparatus according to claim 7 wherein the upper transportation belt is guided around a drive roller arranged on a base plate, and including two direction changing rollers arranged on the carrier plate which are displaceable with the carrier plate in a vertical direction, wherein the diameter (d) of the drive roller corresponds to the spacing between the axes of the direction changing rollers plus the sum of half the diameters thereof, thereby to form a parallel relationship of the upper run and the lower run of the upper transportation belt.

11. Apparatus according to claim 10 wherein the surface of the mandrel has a groove, and the mandrel has a free end, an adjusting roller provided between the cooling means and the drive roller which acts on the inwards side of the lower run of the upper transportation belt, and wherein the lower transportation belt is guided: 1) around a drive roller arranged on the base plate; 2) around displaceable direction changing rollers disposed on the base plate; 3) at the surface of the mandrel in said groove; 4) around a direction changing roller at the free end of the mandrel; and 5) in a recess in the interior of the mandrel.

12. Apparatus according to claim 11 wherein the bottom of the mandrel groove is provided with insulation.

13. Apparatus according to claim 10 including carrier blocks arranged in the base plate which have at least one shaping roller mounted rotatably about a horizontally extending axis, and at least one pair of mutually oppositely disposed shaping rollers each mounted rotatably about respective vertically extending axes, wherein the peripheral surfaces of the shaping rollers are of a concave configuration.

14. Apparatus according to claim 1 wherein the shaping belt cooperates with a belt tensioning means to maintain a uniformly predetermined belt tension and is driven in regard to its speed of rotation in synchronously matched relationship with the speed of rotation of the transportation belts.

15. Apparatus according to claim 14 wherein the shaping belt and transportation belts circulate at the same speed.

16. Apparatus according to claim 1 wherein said heating means is operative to transmit heat to the lower run of the upper transportation belt via contact pressure, and wherein said pressing means has its primary purpose to provide said variable pressing force against said foil and is displaceable in the vertical direction independent of the contact pressure of the heating means and cooling means.

17. The apparatus according to claim 16, wherein said means for preliminarily hardening comprises said pressing means having a cavity therein adapted to receive a coolant for cooling the pressing means and preliminarily hardening the welded seam prior to passing into the cooling means.

18. The apparatus according to claim 1, wherein the shaping belt remains spaced from the periphery of the mandrel and the foil does not contact the mandrel when the shaping belt shapes the foil.

* * * * *